Oct. 20, 1970 T. W. BUSCH 3,535,140
METHOD FOR MANUFACTURE OF DUAL COATED MANIFOLD SHEET WITH
PRESSURE RUPTURABLE MATERIALS
Original Filed Dec. 20, 1965

INVENTOR
Thomas W. Busch
by McDougall, Hersh & Scott
Attys

United States Patent Office 3,535,140
Patented Oct. 20, 1970

3,535,140
METHOD FOR MANUFACTURE OF DUAL COATED MANIFOLD SHEET WITH PRESSURE RUPTURABLE MATERIALS
Thomas W. Busch, Appleton, Wis., assignor to Appleton Coated Paper Company, Appleton, Wis., a corporation of Wisconsin
Continuation of application Ser. No. 514,778, Dec. 20, 1965. This application Mar. 26, 1969, Ser. No. 834,572
Int. Cl. B41m 5/16
U.S. Cl. 117—36.2  3 Claims

ABSTRACT OF THE DISCLOSURE

The preparation of a manifold sheet having a relatively smooth curl-free coating of a clay composition on one side and a relatively smooth curl-free coating of rupturable encapsulated material on the opposite side in which the coatings are applied in tandem in a single coating pass with the clay coating applied before the coating of encapsulated materials and without the application of pressure for smoothing either of the coatings.

---

Figure 1:
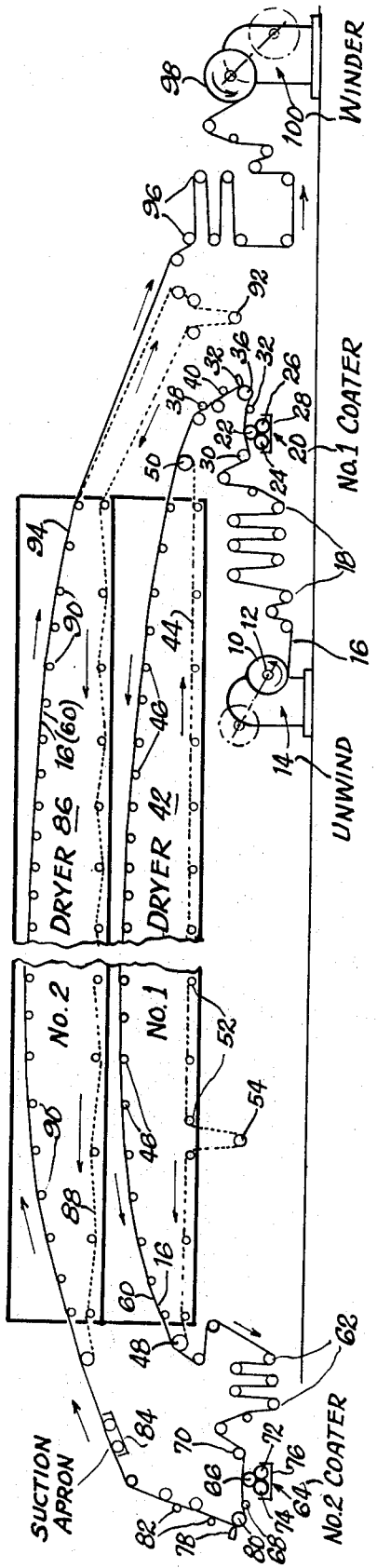

This application is a continuation of application Ser. No. 514,778, filed Dec. 20, 1965, now abandoned.

This invention relates to the art of coated papers and it relates more particularly to the method and apparatus for the fabrication of a two side coated manifold sheet in which at least one of the coatings is formulated with a pressure sensitive material of the type described in the patents hereinafter set forth.

This invention will be described with reference to the manufacture of a manifold sheet adapted for use as an intermediate sheet of a manifold assembly and in which the manifold sheet is sometimes referred to as a colorless carbon. It will be understood that the concepts of this invention will have application also to the manufacture of other two side coated paper products in which one or both of the coatings contain materials which are pressure sensitive such as a coating containing pressure rupturable capsules.

In the U.S. Pat. Nos. 2,299,693; 2,374,862; 2,548,366; 2,712,507; 2,730,456; 2,730,457; 2,800,457; 2,929,736; 2,932,582; 3,020,171; 3,104,980, and 3,129,103, description is made of a copy process and materials for use in the practice of same in which separate coatings are provided on suitable carrier sheets in which one of the coatings is formulated to contain a liquid reactant such as a colorless dye component dissolved in a liquid solvent and which is encapsulated in microscopic capsules uniformly distributed throughout the coating (hereinafter referred to as the emulsion coat), while the other coating is formulated of clay or other particulate substance which is adapted to react with the liquid in response to release from the capsules to form a colored image (hereinafter referred to as the clay coat). When the coating containing the encapsulated liquid is positioned in surface contact with the clay coating, no color develops until pressure is applied by pen, pencil, stylus, typewriter key, die impression or the like, or by heat to rupture the capsules in the imaged areas whereby the liquid released from the ruptured capsule wets out the adjacent receptive material in the clay coating to develop the image.

In a manifold assembly, the top sheet in the assembly will be fabricated with only its underside coated with the emulsion coat, while the bottom sheet in the assembly will be coated on its top side with only the clay coating. All of the sheets in between will be coated on the underside with the emulsion coat and on the top side with the clay coat in a two side coated sheet.

Since the emulsion coat comprises the more expensive materials and therefore represents the more expensive coating, it is desirable to fabricate the clay coat with a high degree of surface smoothness so as to be able to make more effective contact with the emulsion coat and maximize the utilization of the encapsulated liquid released from the coating. In the light of the fact that the emulsion coat is sensitive to pressure which might rupture the capsules, it has been the practice to coat the paper first with the clay coat whereby the latter can be calendered to smooth the coating before application of the emulsion coat.

Considerable difficulty has been experienced in the fabrication of a two side coated paper with the pressure sensitive emulsion coating being the last to be applied since considerable curl and roll develops in the sheet in response to the removal of moisture and shrinkage during the drying step and the curl is incapable of being relieved at high speeds by the usual techniques of steaming or other mechanical operations which rely upon the application of mechanical breakers or the combination of heat and moisture. The curl or roll that forms in the sheet is perhaps due to the greater expansion and contraction of the emulsion coating in response to change in humidity or due to the extraction of water from the emulsion coating during drying.

It is an object of this invention to produce and to provide a method and means for producing a two side coated paper of the type described in which the coatings are sufficiently smooth and uniform throughout the surface of the sheet and wherein the coated sheet is relatively free of curl or roll so as to lie flat in the manifold assembly.

More specifically, it is an object of this invention to provide a method and means for the manufacture of two side coated paper in which at least one side is coated with a composition containing a pressure sensitive component; in which the dual coating can be carried out in a single continuous multiple coating process; in which the dual coated paper is relatively free of roll or curl, and in which the process can be carried out in a simple and efficient manner, with a minimum amount of time, labor, and equipment.

Figure 2:
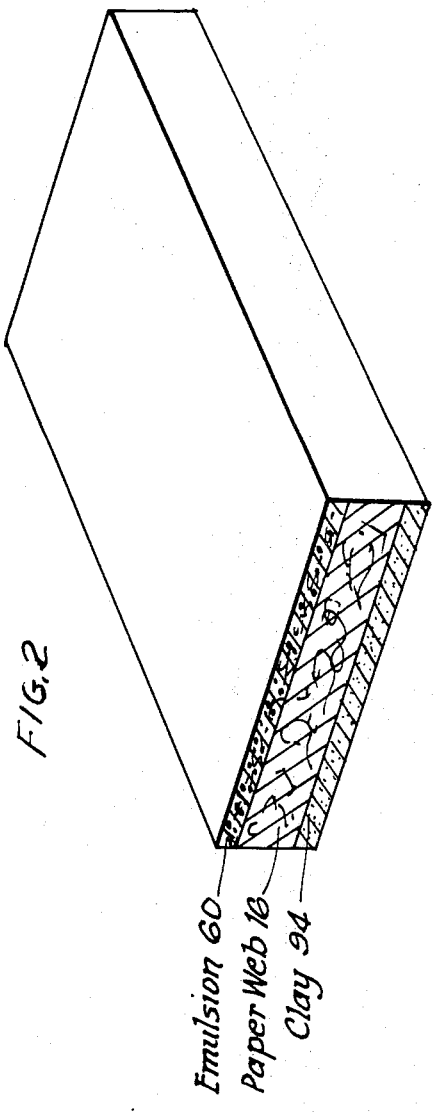

These and other objects and advantages of this invention will hereinafter appear and for purposes of illustration, but not of limitation, an embodiment of the invention is shown in the accompanying drawing, in which:

FIG. 1 is a schematic elevational view of a coating machine embodying the features of this invention, and FIG. 2 is an enlarged perspective view, partially in section, of a dual coated manifold sheet produced in accordance with the practice of this invention.

Although the invention is addressed to the method and apparatus for the dual coating of paper base stock, the problem sought to be overcome by this invention arises primarily by reason of the unique characteristics of the compositions with which the base paper is coated.

Briefly described, the emulsion coating is formulated of an aqueous composition containing rupturable microscopic capsules of tanned gelatin containing a liquid color-forming ingredient, such as a colorless dyestuff dissolved in an organic solvent. There may be included within the emulsion coating composition, a substantial amount (up to 50% by weight of the capsules) of a coarse, solid particulate material, such as cellulose fibers suspended with the rupturable capsules and in which a small amount of water soluble binder may be dissolved in the aqueous medium. For a more detailed description of the emulsion coating, reference may be made to the examples in U.S. Pat. No. 2,711,375, and others of the patents heretofore set forth.

The clay coating comprises an aqueous system having clay, such as attapulgite clay, in finely divided form, suspended therein, with or without other fillers such as calcium carbonate, silica gel, satin white and the like, and a small amount of resinous binder. For a more detailed description and formulation of the clay coating composition, reference may be made to the examples in the aforementioned patents.

Referring now to the concepts of the invention in a method and apparatus for the manufacture of intermediate sheets having dual coatings of the type described on opposite sides of the paper base sheet, the paper raw stock, such as 13-pound manifolding bond, is supplied in the form of rolls 10 mounted for free rotational movement on a spindle 12 supported on the unwind stand 14. The web 16 of raw stock paper is passed from the roll 10 over a series of idler rollers and guide rollers 18 to a first coating station 20.

The first coating station comprises an applicator roll 22 in communication with a transfer roll 24 and a metering roll 26, the bottom portion of the transfer roll being immersed in a bath of the emulsion coating composition in pan 28. The applicator roll 22 engages the bottom side of the paper web 16 as it passes between guide rolls 30 and 32 to apply an excess of the emulsion coating composition to the bottom side of the paper web. An amount of emulsion coating composition corresponding to about 4½ pounds per 3300 square feet is applied by the applicator roll at this first station.

From the first coating station 20, the one side coated web is advanced directly to an air knife 34 which co-operates with the turning roll 36 to meter the coating on the surfaces of the paper and uniformly to distribute the coating composition over the surface thereof. The coated web is advanced, while wet with the emulsion coating composition, from the air knife to a series of reverse rolls 38 and 40 which engage the applied coating while turning in a direction opposite to the linear movement of the web to work the coating, in the absence of pressure, to smooth the applied coating composition on the surface of the web. Such smoothing reversing rolls are uncommon in a coating operation but they are effective with compositions of the type described to break up clumps and to produce a pattern-free coating.

From the reversing rolls, the paper web, which has been turned about the roller 36, to position the coated side uppermost, is advanced through one section 42 of a drying oven maintained at a temperature of about 220° F. while supported on an endless belt 44. The upper run of the belt is supported on rollers 46 arranged in a substantially arcuate path through the dryer and, for this purpose, it is preferred to make use of a foraminous belt or a belt formed of a vapor permeable material to enable the escape of water vapor therethrough when released from the coating. The endless belt 44 turns about rollers 48 and 50 outside the dryer and the return run passes through the dryer section to maintain temperature while being supported on a bottom run of rollers 52 provided with a take-up roller 54 for maintaining the proper tension in the supporting belt.

The base paper 16 with the dried emulsion coating 60 on the top side thereof is passed from the drying oven 42 over a series of guide rollers and tensioning rollers 62 to a second coating station 64 whereby the clay coating composition is applied to the underside of the web opposite the dried emulsion coat. The second coating station is constructed somewhat similar to the first in that it comprises an upper applicator roll 66 in contact with the underside of the web as it passes between guide rollers 68 and 70. The applicator roll 66 is supported between a transfer roll 72 and a metering roll 74 which take up coating composition from a bath in the coating pan 76 in which the bottom portion of the transfer roll is immersed. The applicator roll is adjusted to apply the clay coating composition to the underside of the web in coating weights of about 3½ pounds per 3300 square feet.

From the coating station 64, the coated web is advanced to a second air knife 78 and over roller 80 which again operates to meter the amount of coating composition allowed to remain on the web and to distribute the coating uniformly across the web. Following the air knife, the clay coated surface is engaged by one or more reversing smoothing rolls 82 to smooth the coating by the reverse rolling technique previously described. While such reversing rolls are preferred for improving the smoothness of the coating, they are not essential for the clay coat.

From the smoothing rolls 82, the web coated on both sides and turned about the roller 80 to position the dried emulsion coat lowermost with the wet clay coat uppermost, is advanced over a suction apron 84 and then to an upper section 86 of the drying oven through which it is carried on the surface of a supporting endless belt 88. The upper run of the belt is supported on longitudinally spaced apart crosswise extending rollers 90 arranged in an arcuate path through the dryer and the belt continues to support the web for a short distance beyond the exit of the dryer whereafter the belt turns downwardly and back about rollers for return through the oven. A take-up roller 92 is provided outside of the dryer for adjusting the tension of the belt. As with the belt 44, it is preferred to make use of a vapor permeable belt to enable the escape of vapors therethrough during passage through the dryer.

The web 16 coated on one side with a dried emulsion coat 60 and on the opposite side with a dried clay coat 94 is passed over a series of guide rollers and tensioning rollers 96 to a wind-up roll 98 mounted on a winder stand 100 and powered to wind the coated web onto the roll. Thus the web is drawn through the coating apparatus and dryer under tension supplied by the wind-up roll.

It has been found that when use is made of air knives and smoothing rolls in the processing of the applied coating compositions, it becomes possible to dispense with calendering operations and to modify the coating sequence to provide for the application and drying of the emulsion coating composition in advance of the application and drying of the clay coat. Under such circumstances, it becomes possible to apply the separate coating compositions in sequence in a continuous operation on a continuously moving web thereby to obviate the necessity for making separate passes for each coating operation with a lapse of time between each coating application. Modification of the coating procedure to apply and dry the emulsion coating composition in advance of the application and drying of the clay coating composition has been found to result in a two side coated paper web which may be sheeted to form manifold sheets which lie substantially flat and which have little, if any, tendency to curl thereby to eliminate the necessity for a separate flattening operation or application of additional coatings for purposes of producing a flat sheet.

In accordance with the concepts of this invention, the clay coating composition is applied to the paper web after the emulsion coating composition has been applied to the opposite side of the paper and dried. In the event that the clay coating composition is applied before the emulsion coating or before the emulsion coating composition has been substantially dried, the resulting dual coated paper will be characterized by a decided curl or roll which make it less fit for use in duplicating or manifold sets or as a colorless carbon.

While the concepts of this invention find their best use in a continuous dual coating operation in a single coating pass, it will be understood that many of the advantages and improvements of this invention will be capable of achievement by first coating the web with the emulsion coating composition followed by smoothing and drying in one pass and then coating the opposite side of the web with the clay coating composition and drying in a subsequent separate pass.

It will be further understood that numerous changes may be made in the details of formulation and operation, without departing from the spirit of the invention, especially as defined in the following claims.

I claim:
1. In the method of producing at high speed a substantially colorless carbon manifold sheet having relatively uniform smooth coatings on opposite sides of the sheet which is relatively free of curl, one side being coated with an aqueous emulsion containing pressure rupturable capsules of a liquid color forming material, the other side being coated with an aqueous clay coating composition, the steps of continuously moving a sheet of thin, non-absorbent paper in a linear direction as an endless web, processing the continuously moving sheet in the order specified of metering an amount of an emulsion coating composition onto one side of the moving web of paper as a first coating, doctoring the applied emulsion coating while wet with an air knife to meter the coating and uniformly to distribute the coating composition over the coated side of the moving web of paper, drying the emulsion coating while being supported in a relaxed state on a continuous conveyor surface with the emulsion side uppermost, coating the opposite side of the moving web of paper with a clay coating composition as a second coating, doctoring the coating while wet with an air knife to meter the coating and uniformly to distribute the clay coating composition over the surface of the moving web of paper, and then drying the clay coating, all of said operations being carried out as a continuous operation.

2. The method as claimed in claim 1 which includes the step of engaging the surface of the doctored emulsion coating, while wet, with reverse smoothing rolls to work the coating and smooth the emulsion coating on the surface of the web of paper.

3. The method as claimed in claim 1 which includes the steps of engaging the surface of the doctored emulsion coating while wet with reverse smoothing rolls to work the coating and to smooth the emulsion coating on the surface of the web of paper, and engaging the surface of the doctored clay coating while wet with reverse smooth rolls to work the coating and smooth the clay coating composition on the surface of the paper web.

References Cited

UNITED STATES PATENTS

| | | |
|---|---|---|
| 2,325,798 | 8/1943 | Porter. |
| 2,388,339 | 11/1945 | Paxtom et al. |
| 2,711,378 | 6/1955 | Sandberg. |
| 3,020,170 | 2/1962 | Macaulay. |
| 3,186,861 | 6/1965 | Smith et al. |
| 3,196,038 | 7/1965 | Schoch. |
| 3,226,252 | 12/1965 | Hemstock. |
| 3,311,499 | 3/1967 | Busch et al. |

MURRAY KATZ, Primary Examiner

U.S. Cl. X.R.

117—64, 68, 119.8; 118—63